US008827162B2

(12) United States Patent
Shearer

(10) Patent No.: US 8,827,162 B2
(45) Date of Patent: Sep. 9, 2014

(54) TRAVEL KIOSK

(75) Inventor: Frank W. Shearer, Lawrenceville, GA (US)

(73) Assignee: NCR Corporation, Duluth, GA (US)

(*) Notice: Subject to any disclaimer, the term of this patent is extended or adjusted under 35 U.S.C. 154(b) by 53 days.

(21) Appl. No.: 13/097,433

(22) Filed: Apr. 29, 2011

(65) Prior Publication Data

US 2012/0273574 A1 Nov. 1, 2012

(51) Int. Cl.
*G06K 13/00* (2006.01)
*G07D 7/00* (2006.01)

(52) U.S. Cl.
CPC .................................... *G07D 7/0026* (2013.01)
USPC ............................ 235/485; 235/375; 235/380

(58) Field of Classification Search
USPC .......................................... 235/375, 380, 485
See application file for complete search history.

(56) References Cited

U.S. PATENT DOCUMENTS

| | | | | |
|---|---|---|---|---|
| 2004/0078335 A1* | 4/2004 | Calvesio et al. | ................ | 705/50 |
| 2008/0169341 A1* | 7/2008 | Soderberg et al. | ............ | 235/375 |
| 2008/0296394 A1* | 12/2008 | Melnik et al. | ................. | 235/485 |
| 2008/0304111 A1* | 12/2008 | Queenan et al. | .............. | 358/302 |
| 2010/0078473 A1* | 4/2010 | Yepez | .......................... | 235/380 |

* cited by examiner

*Primary Examiner* — Michael G Lee
*Assistant Examiner* — Tabitha Chedekel
(74) *Attorney, Agent, or Firm* — Paul W. Martin; Harden E. Stevens, III

(57) ABSTRACT

A travel kiosk with improved passport reading. The travel kiosk includes a shelf for correctly positioning a passport for reading machine readable code in the passport. A single imager reads the machine readable code in the passport and other machine readable codes in other travel documents, such as driver licenses and travel documents displayed by smart phones.

2 Claims, 3 Drawing Sheets

TRAVEL KIOSK

BACKGROUND

Travel kiosks may include a reader for reading machine readable codes, such as barcodes, on travel documents such as receipts, coupons, driver's licenses, and boarding passes. The reader may also read machine readable codes displayed by portable devices, such as smart phones.

Travel kiosks may include a different reader for reading information including machine readable codes from passports. This different reader includes an imaging device, such as a charge coupled device camera, for capturing an image of a passport. Software obtains the information from the image via optical character recognition.

It would be desirable to provide a travel kiosk that uses a single reader for reading information from both travel documents and passports.

SUMMARY

A travel kiosk is provided.

The travel kiosk includes a front surface, a passport guide protruding from the front surface, and a single imager coupled to the front surface having a field of view for reading a passport in the passport guide and a barcode on a travel document different than the passport.

The passport guide includes a shelf for correctly positioning a passport for reading machine readable code in the passport.

DETAILED DESCRIPTION

Figure 1:
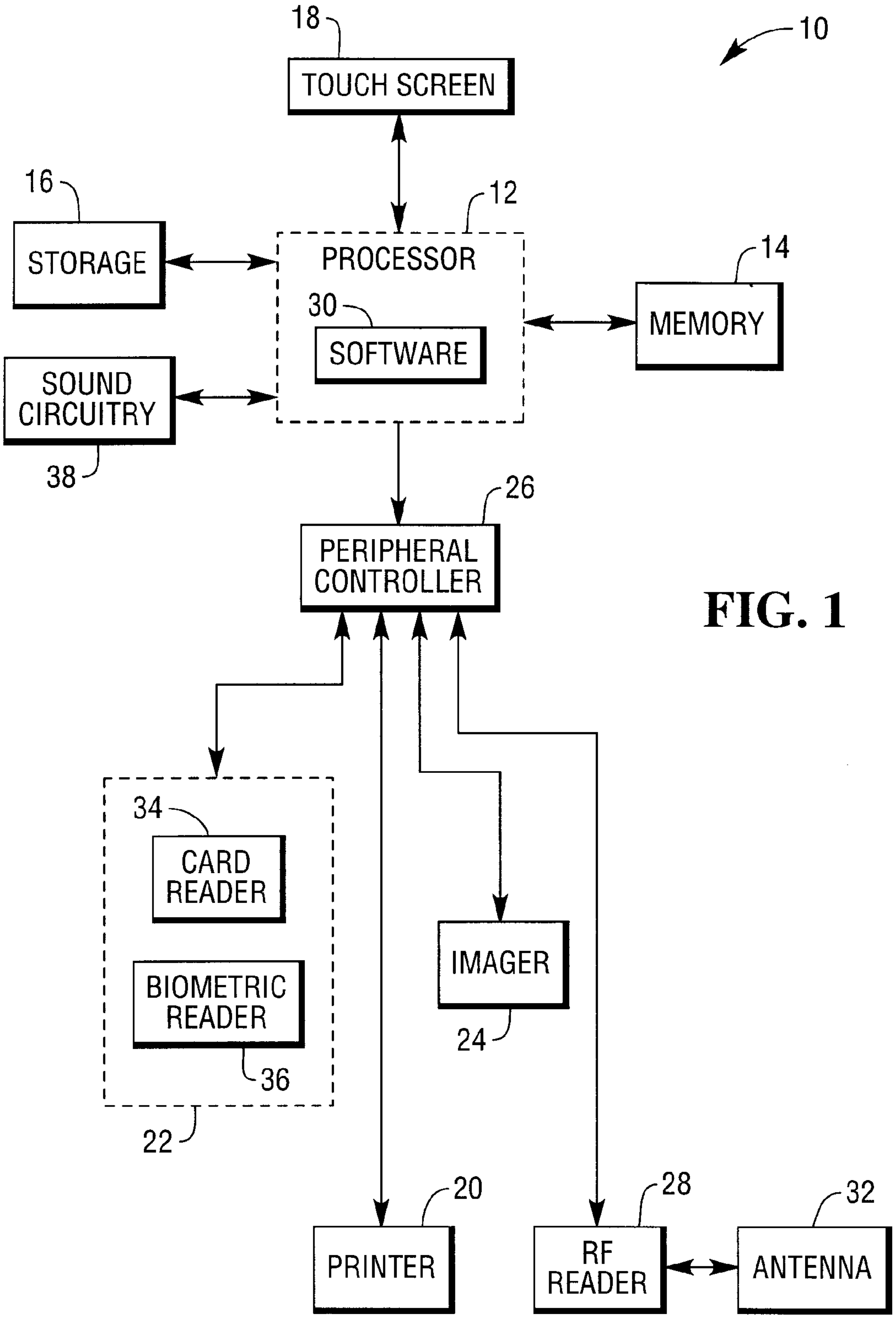
FIG. 1 is a block diagram of an example travel kiosk.

With reference to FIG. 1, travel kiosk 10 includes processor 12, memory 14, storage 16, and touch screen 18.

Processor 12 executes software 30 for displaying instructions, issuing prompts, and receiving inputs from users through touch screen 18. Software 30 may include a collection of different screens tailored to performing a transaction, such as a travel check-in process. Processor 12 loads software 30 from storage 16 into memory 14 during execution.

Kiosk 10 may additionally include sound circuitry 38 for providing aural feedback to an operator during use of kiosk 10 and its peripherals. Sound circuitry 38 may include a tone generator and speakers.

Software 30 also controls a number of peripheral modules through one or more peripheral controllers 26. Peripheral controller 26 may include a serial controller, such as a Universal Serial Bus (USB) controller.

Kiosk 10 includes a peripheral 22, which includes card reader 34 and biometric reader 36. Card reader 34 reads cards such as payment cards, loyalty cards, and driver's licenses under the control of software 30. Card reader 22 may include any of the known types of magnetic card readers, including a manual drag-through slot card reader, a motorized card reader, or an insertion type push-pull card reader.

Biometric reader 36 may include a fingerprint reader.

Kiosk 10 further includes printer 20 for printing receipts, boarding passes, and travel agendas under the control of software 30.

Kiosk 10 further includes an imager 24 for capturing images from receipts, boarding passes, driver licenses, passports, and other documents under the control of software 30. Imager 24 may also capture images from portable devices, such as smart phones. Thus, use of single imager 24 avoids having to install separate readers for passports and other items.

Imager 24 may include a camera, such as a charge coupled device camera.

Software 30 identifies and decodes barcodes in the images. For passports, software 30 obtains information from passport images, including machine readable zones (MRZs) of images, via optical character recognition.

It is also envisioned in an alternative embodiment that imager 24 may additionally include its own processor and software, taking on some of the functions otherwise performed by software 30. Consistent with this alternative embodiment, imager 24 may identify and decode barcodes in the images instead of software 30, and then pass the characters to software 30 for further processing. For passports, imager 24 may obtain information from passport images, including MRZs of images, via optical character recognition and pass the information to software 30 for further processing.

Software 30 may activate imager 24 as part of a step in a transaction. For example, during a step in a travel check-in process, software 30 may display a screen instructing a traveler to position passport 40 (FIGS. 2-5) or other travel document within the field of view of imager 24. Software 30 may activate image capture by imager 24 coincident with displaying this screen and may then deactivate imager 24 following successful image capture.

Kiosk 10 further includes radio frequency (RF) reader 28, which interrogates and reads data from RF chips in passports through antenna 32 under the control of software 30. RF reader 28 may also be used to read contactless payment cards.

Software 30 may activate RF reader 28 in a similar fashion as imager 24 as part of a step in a transaction. For example, during the step of capturing an image from passport 40, software 30 may activate RF reader 28. Software 30 may then deactivate RF reader 28 following successful image capture or if software 30 determines that no RF chip is present.

Figure 2:
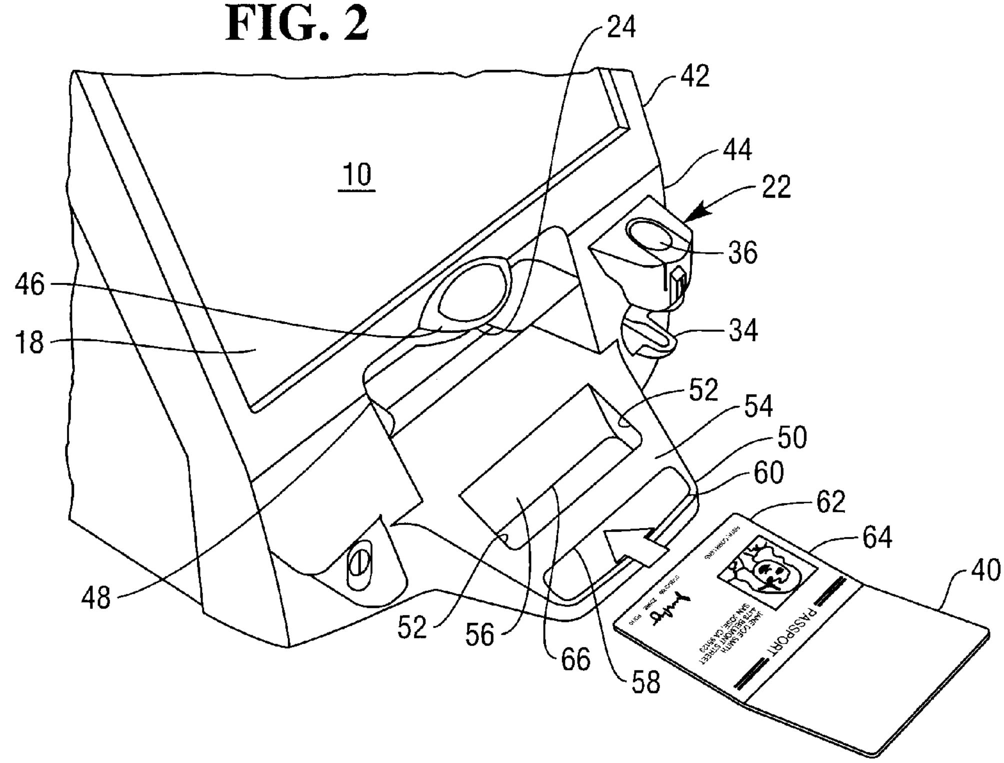
FIG. 2 is a perspective view of a first example embodiment of the travel kiosk illustrating passport insertion.
Figure 3:
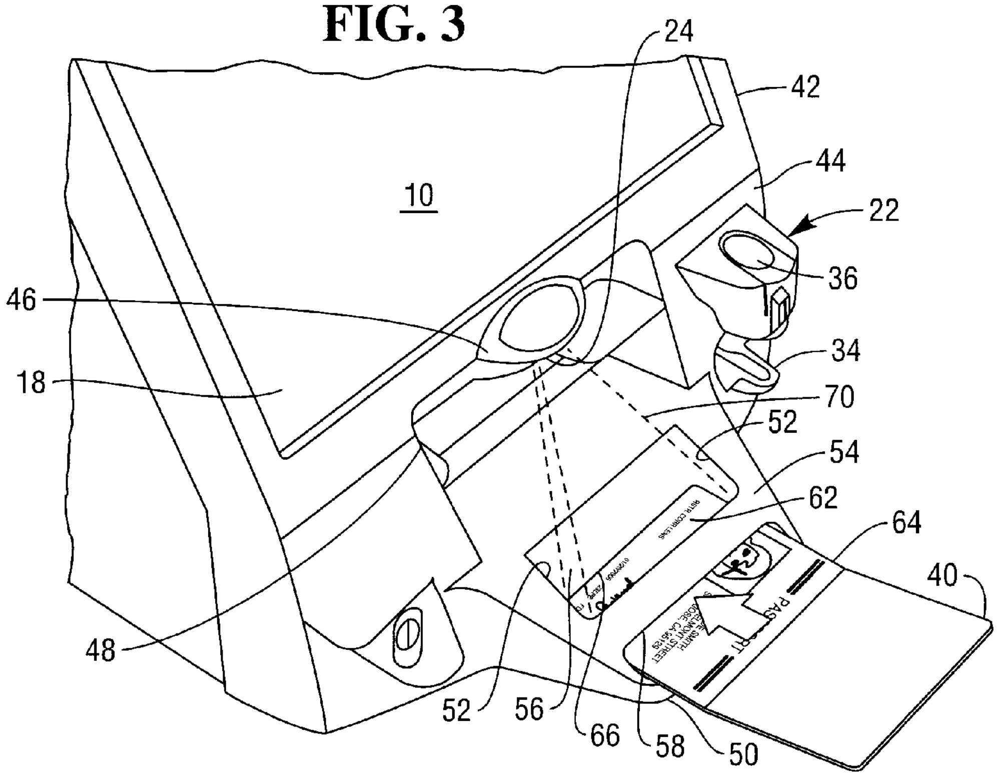
FIG. 3 is another perspective view of the first example travel kiosk illustrating passport insertion.

Turning now to FIGS. 2-3, an example first embodiment of travel kiosk 10 is illustrated in further detail.

Travel kiosk 10 includes an upper fascia portion 42 and lower fascia portion 44.

Upper fascia portion 42 surrounds touch screen 18. Upper fascia portion 42 includes support for imager 24 in the form of overhang 46. Imager 24 is located beneath overhang 46. Imager 24 is aimed in a generally downward direction in order to capture images of barcodes on receipts, boarding passes, driver licenses, and other documents, in hard copy form or displayed by portable devices, such as smart phones.

Lower fascia portion 44 includes support for peripheral 22 and a document delivery opening 48 for printer 20.

Protruding from lower fascia portion 44 is passport shelf 50. Shelf 50 holds passport 40 motionless and at a correct distance (typically 5.5") from imager 24 and within the field of view 70 (FIG. 3) of imager 24. Shelf 50 may be integral with and extend from a printer document delivery tray at the base of document delivery opening 48.

In the example embodiment of FIGS. 2-3, shelf 50 further includes side walls 52, guide cross member 54, and backstop 56.

Side walls 52 create a channel for guiding passport 40 during insertion whose width approximates the width of passport 40.

Guide cross member 54 is oriented transversely to side walls 52 and connects to the upper portions of side walls 52 to create a aperture 58 with sufficient clearance for passport 40 to pass.

Guide cross member 54 may include guides, leaf springs, or similar features molded into or attached to guide cross member 54 so that pressure is applied to passport 40, helping to hold passport 40 flat and stationary. Guide cross member 54 may be separately installable and adjustable.

Backstop 56 limits inward movement of passport 40.

Shelf 50 may optionally include an indentation or notch 66 in backstop 56 with a height approximating the thickness of the leading portion of opened passport 40.

The MRZ occupies a small section of passport 40. It's typically located at the leading edge 62 of the passport's data page 64. A user orients passport 40 so that leading edge 62 of data page 64 is inserted first through slot 54 so that leading edge 62 ends up adjacent backstop 56. The MRZ is within field of view 70 and not obscured. The user may verify proper insertion by ensuring that the MRZ data is viewable between guide cross member 54 and backstop 56.

Advantageously, correct placement of passport 40 by a user is easier because the information is visible during placement (as opposed to being face down).

To capture images of other barcodes, a user places the barcode to be captured face up in the field of view of imager 24, between shelf 50 and imager 24, and holds the barcode steady.

For driver licenses, a user may place the drive license against backstop 56 near the top of shelf 50, which is at an optimal distance of about 4.5 inches from imager 24 for reading a driver license barcode.

Backstop 56 may additionally include another notch near the top of shelf 50 for retaining the driver license at the correct distance.

Figure 4:
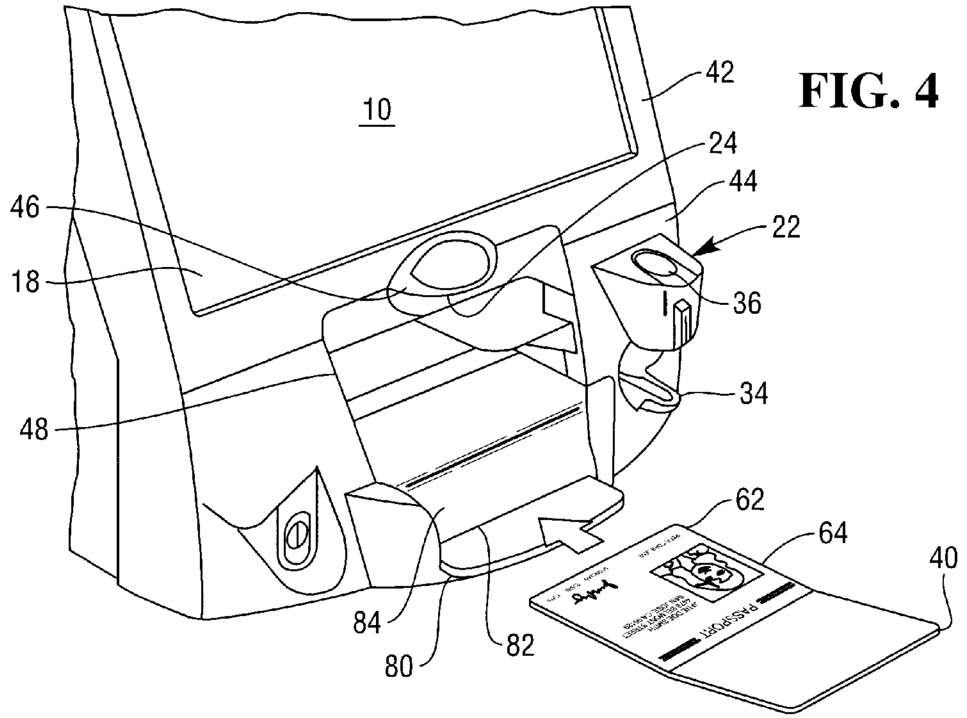
FIG. 4 is a perspective view of a second example travel kiosk illustrating passport insertion.
Figure 5:
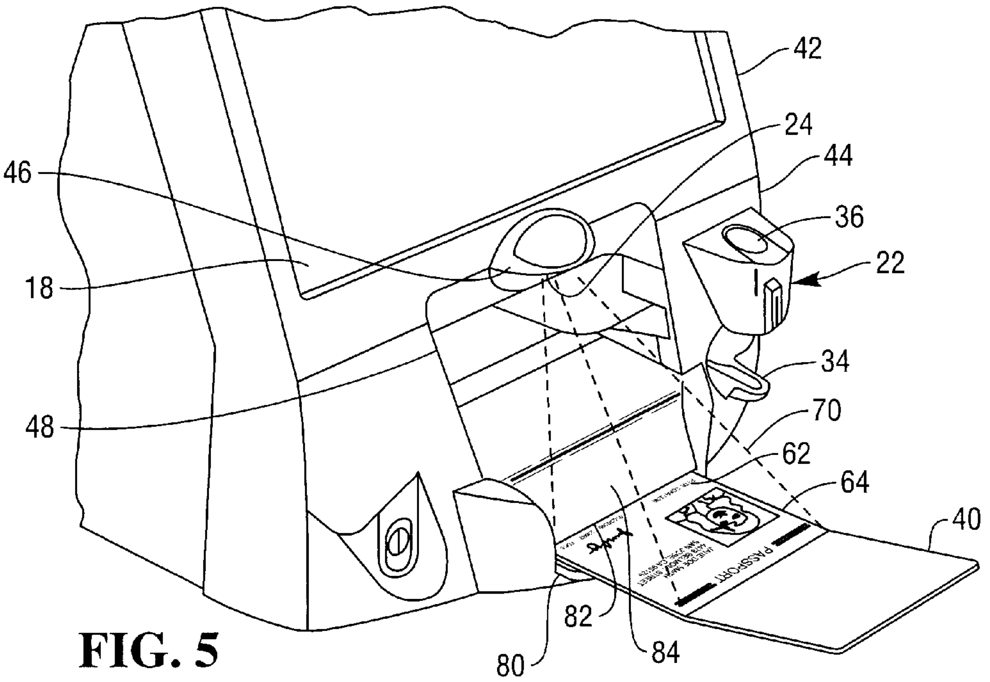
FIG. 5 is another perspective view of the second example travel kiosk illustrating passport insertion.

With reference to FIG. 4-5, an example second embodiment of travel kiosk 10 is illustrated in further detail.

Shelf 80 is smaller, extending less distance from fascia 44 than shelf 50 of the first embodiment. Further, the second embodiment fails to include a cross member. Shelf 80 includes an indentation or notch 82 in backstop 84, as is optionally included in the first example embodiment.

As in the first embodiment, a user places other barcodes face up in the field of view of imager 24, between shelf 80 and imager 24, and holds the barcodes steady.

Although particular reference has been made to certain embodiments, variations and modifications are also envisioned within the spirit and scope of the following claims.

What is claimed is:

1. A travel kiosk comprising:
a first section containing a touch screen;
a second section adjacent the first section including a document delivery aperture and a document delivery tray within the document delivery aperture;
a passport guide extending from the document delivery tray; and
an imager mounted above the aperture having a field of view oriented in a generally downward direction aligned to read a passport in the passport guide and a barcode on a travel document different than the passport positioned in the field of view of the imager but not blocking a view of the passport;
wherein the passport guide limits movement of the passport during image capture by the imager and includes a shelf;
first and second side walls defining a channel having a width that is approximately the width of a passport; and
a back wall for limiting inward movement of the passport following insertion into the channel.

2. A travel kiosk comprising:
a processor adapted to executing instructions completing a travel process;
a first section containing a touch screen for displaying screens associated with steps in the travel process;
a second section adjacent the first section including a document delivery aperture and a document delivery tray within the document delivery aperture;
a passport guide extending from the document delivery tray; and
an imager mounted above the aperture having a field of view oriented in a generally downward direction and adapted to receive a first instruction from the processor during display of a first screen to read a passport in the passport guide and to receive a second instruction from the processor during display of a second screen to read a barcode on a travel document different than the passport positioned in the field of view between the passport guide and the imager.

* * * * *